(12) United States Patent
Phan et al.

(10) Patent No.: US 8,316,165 B2
(45) Date of Patent: *Nov. 20, 2012

(54) DIRECT SECONDARY DEVICE INTERFACE BY A HOST

(75) Inventors: Anson Ba Phan, Fremont, CA (US); Jerrold Allen Beckmann, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/313,341

(22) Filed: Dec. 7, 2011

(65) Prior Publication Data

US 2012/0079455 A1 Mar. 29, 2012

Related U.S. Application Data

(63) Continuation of application No. 12/765,338, filed on Apr. 22, 2010, now Pat. No. 8,090,886, which is a continuation of application No. 11/110,612, filed on Apr. 19, 2005, now Pat. No. 7,725,628.

(60) Provisional application No. 60/564,125, filed on Apr. 20, 2004.

(51) Int. Cl.
*G06F 3/00* (2006.01)
*G06F 5/00* (2006.01)
*G06F 13/12* (2006.01)
*G06F 13/38* (2006.01)

(52) U.S. Cl. ............................ 710/72; 710/36; 710/73

(58) Field of Classification Search .................. 710/36, 710/72, 73

See application file for complete search history.

(56) References Cited

U.S. PATENT DOCUMENTS

| | | | |
|---|---|---|---|
| 4,099,069 | A | 7/1978 | Cricchi et al. |
| 4,130,900 | A | 12/1978 | Watanabe |
| 4,210,959 | A | 7/1980 | Wozniak |
| 4,309,627 | A | 1/1982 | Tabata |
| 4,355,376 | A | 10/1982 | Gould |
| 4,398,248 | A | 8/1983 | Hsia et al. |
| 4,405,952 | A | 9/1983 | Slakmon |
| 4,414,627 | A | 11/1983 | Nakamura |
| 4,450,559 | A | 5/1984 | Bond et al. |
| 4,456,971 | A | 6/1984 | Fukuda et al. |
| 4,468,730 | A | 8/1984 | Dodd et al. |

(Continued)

FOREIGN PATENT DOCUMENTS

AU 0 557 723 1/1987

(Continued)

OTHER PUBLICATIONS

Kai Hwang & Faye A. Briggs, *Computer Architecture and Parallel Processing*, McGraw-Hill Book Co., 1984, p. 64.

(Continued)

*Primary Examiner* — Kris Rhu

(74) *Attorney, Agent, or Firm* — Leffert Jay & Polglaze, P.A.

(57) ABSTRACT

A device has a controller and a function module configured to be in communication with the controller as a result of the controller receiving a pass-through vendor specific command. In some embodiments, the controller is configured to receive the pass-through vendor specific command from an application software module of a host through an interface that is configured in accordance with a standard that does not allow communication to occur between the controller and the function module.

27 Claims, 9 Drawing Sheets

U.S. PATENT DOCUMENTS

| | | | |
|---|---|---|---|
| 4,473,878 A | 9/1984 | Zolnowsky et al. |
| 4,476,526 A | 10/1984 | Dodd |
| 4,498,146 A | 2/1985 | Martinez |
| 4,525,839 A | 6/1985 | Nozawa et al. |
| 4,532,590 A | 7/1985 | Wallach et al. |
| 4,609,833 A | 9/1986 | Gutterman |
| 4,616,311 A | 10/1986 | Sato |
| 4,654,847 A | 3/1987 | Dutton |
| 4,710,871 A | 12/1987 | Belknap et al. |
| 4,746,998 A | 5/1988 | Robinson et al. |
| 4,748,320 A | 5/1988 | Yorimoto et al. |
| 4,757,474 A | 7/1988 | Fukushi et al. |
| 4,774,700 A | 9/1988 | Satoh et al. |
| 4,780,855 A | 10/1988 | Iida et al. |
| 4,788,665 A | 11/1988 | Fukuda et al. |
| 4,797,543 A | 1/1989 | Watanabe |
| 4,800,520 A | 1/1989 | Iijima |
| 4,829,169 A | 5/1989 | Watanabe |
| 4,843,224 A | 6/1989 | Ohta et al. |
| 4,896,262 A | 1/1990 | Wayama et al. |
| 4,914,529 A | 4/1990 | Bonke |
| 4,920,518 A | 4/1990 | Nakamura et al. |
| 4,924,331 A | 5/1990 | Robinson et al. |
| 4,943,745 A | 7/1990 | Watanabe et al. |
| 4,953,122 A | 8/1990 | Williams |
| 4,970,642 A | 11/1990 | Yamamura |
| 4,970,727 A | 11/1990 | Miyawaki et al. |
| 5,070,474 A | 12/1991 | Tuma et al. |
| 5,093,785 A | 3/1992 | Iijima |
| 5,168,465 A | 12/1992 | Harari |
| 5,198,380 A | 3/1993 | Harari |
| 5,200,959 A | 4/1993 | Gross et al. |
| 5,218,695 A | 6/1993 | Noveck et al. |
| 5,220,518 A | 6/1993 | Haq |
| 5,226,168 A | 7/1993 | Kobayashi et al. |
| 5,227,714 A | 7/1993 | Lou |
| 5,253,351 A | 10/1993 | Yamamoto et al. |
| 5,267,218 A | 11/1993 | Elbert |
| 5,268,318 A | 12/1993 | Harari |
| 5,268,870 A | 12/1993 | Harari |
| 5,270,979 A | 12/1993 | Harari et al. |
| 5,293,560 A | 3/1994 | Harari |
| 5,297,148 A | 3/1994 | Harari et al. |
| 5,303,198 A | 4/1994 | Adachi et al. |
| 5,305,276 A | 4/1994 | Uenoyama |
| 5,305,278 A | 4/1994 | Inoue |
| 5,315,541 A | 5/1994 | Harari et al. |
| 5,315,558 A | 5/1994 | Hag |
| 5,329,491 A | 7/1994 | Brown et al. |
| 5,337,275 A | 8/1994 | Garner |
| 5,341,330 A | 8/1994 | Wells et al. |
| 5,341,339 A | 8/1994 | Wells |
| 5,341,341 A | 8/1994 | Fukuzo |
| 5,353,256 A | 10/1994 | Fandrich et al. |
| 5,357,475 A | 10/1994 | Hasbun et al. |
| 5,359,569 A | 10/1994 | Fujita et al. |
| 5,365,127 A | 11/1994 | Manley |
| 5,369,615 A | 11/1994 | Harari et al. |
| 5,371,702 A | 12/1994 | Nakai et al. |
| 5,381,539 A | 1/1995 | Yanai et al. |
| 5,382,839 A | 1/1995 | Shinohara |
| 5,384,743 A | 1/1995 | Rouy |
| 5,388,083 A | 2/1995 | Assar et al. |
| 5,396,468 A | 3/1995 | Harari et al. |
| 5,404,485 A | 4/1995 | Ban |
| 5,406,527 A | 4/1995 | Honma |
| 5,418,752 A | 5/1995 | Harari et al. |
| 5,422,842 A | 6/1995 | Cernea et al. |
| 5,422,856 A | 6/1995 | Sasaki et al. |
| 5,428,621 A | 6/1995 | Mehrotra et al. |
| 5,430,682 A | 7/1995 | Ishikawa et al. |
| 5,430,859 A | 7/1995 | Norman et al. |
| 5,431,330 A | 7/1995 | Wieres |
| 5,434,825 A | 7/1995 | Harari |
| 5,438,573 A | 8/1995 | Mangan et al. |
| 5,465,235 A | 11/1995 | Miyamoto |
| 5,465,338 A | 11/1995 | Clay |
| 5,471,478 A | 11/1995 | Mangan et al. |
| 5,473,765 A | 12/1995 | Gibbons et al. |
| 5,479,638 A | 12/1995 | Assar et al. |
| 5,485,595 A | 1/1996 | Assar et al. |
| 5,490,117 A | 2/1996 | Oda et al. |
| 5,495,442 A | 2/1996 | Cernea et al. |
| 5,504,760 A | 4/1996 | Harari et al. |
| 5,508,971 A | 4/1996 | Cernea et al. |
| 5,513,138 A | 4/1996 | Manabe et al. |
| 5,515,333 A | 5/1996 | Fujita et al. |
| 5,519,847 A | 5/1996 | Fandrich et al. |
| 5,523,980 A | 6/1996 | Sakui et al. |
| 5,524,230 A | 6/1996 | Sakaue et al. |
| 5,530,673 A | 6/1996 | Tobita et al. |
| 5,530,828 A | 6/1996 | Kaki et al. |
| 5,530,938 A | 6/1996 | Akasaka et al. |
| 5,532,962 A | 7/1996 | Auclair et al. |
| 5,532,964 A | 7/1996 | Cernea et al. |
| 5,534,456 A | 7/1996 | Yuan et al. |
| 5,535,328 A | 7/1996 | Harari et al. |
| 5,541,551 A | 7/1996 | Brehner et al. |
| 5,544,118 A | 8/1996 | Harari |
| 5,544,356 A | 8/1996 | Robinson et al. |
| 5,552,698 A | 9/1996 | Tai et al. |
| 5,554,553 A | 9/1996 | Harari |
| 5,563,825 A | 10/1996 | Cernea et al. |
| 5,566,314 A | 10/1996 | DeMarco et al. |
| 5,568,439 A | 10/1996 | Harari |
| 5,572,466 A | 11/1996 | Sukegawa |
| 5,579,502 A | 11/1996 | Konishi et al. |
| 5,581,723 A | 12/1996 | Hasbun et al. |
| 5,583,812 A | 12/1996 | Harari |
| 5,592,415 A | 1/1997 | Kato et al. |
| 5,592,420 A | 1/1997 | Cernea et al. |
| 5,596,526 A | 1/1997 | Assar et al. |
| 5,598,370 A | 1/1997 | Niijima et al. |
| 5,602,987 A | 2/1997 | Harari et al. |
| 5,603,001 A | 2/1997 | Sukegawa et al. |
| 5,606,660 A | 2/1997 | Estakhri et al. |
| 5,611,067 A | 3/1997 | Okamoto et al. |
| 5,640,528 A | 6/1997 | Harney et al. |
| 5,642,312 A | 6/1997 | Harari |
| 5,648,929 A | 7/1997 | Miyamoto |
| 5,663,901 A | 9/1997 | Wallace et al. |
| 5,693,570 A | 12/1997 | Cernea et al. |
| 5,712,819 A | 1/1998 | Harari |
| 5,719,808 A | 2/1998 | Harari et al. |
| 5,723,990 A | 3/1998 | Roohparvar |
| 5,734,567 A | 3/1998 | Griffiths et al. |
| 5,745,418 A | 4/1998 | Ma et al. |
| 5,754,567 A | 5/1998 | Norman |
| 5,757,712 A | 5/1998 | Nagel et al. |
| 5,758,100 A | 5/1998 | Odisho |
| 5,761,117 A | 6/1998 | Uchino et al. |
| 5,768,190 A | 6/1998 | Tanaka et al. |
| 5,768,195 A | 6/1998 | Nakamura et al. |
| 5,773,901 A | 6/1998 | Kantner |
| 5,778,418 A | 7/1998 | Auclair et al. |
| 5,781,478 A | 7/1998 | Takeuchi et al. |
| 5,787,445 A | 7/1998 | Daberko |
| 5,787,484 A | 7/1998 | Norman |
| RE35,881 E | 8/1998 | Barrett et al. |
| 5,799,168 A | 8/1998 | Ban |
| 5,802,551 A | 9/1998 | Komatsu et al. |
| 5,809,515 A | 9/1998 | Kaki et al. |
| 5,809,558 A | 9/1998 | Matthews et al. |
| 5,809,560 A | 9/1998 | Schneider |
| 5,818,350 A | 10/1998 | Estakhri et al. |
| 5,818,781 A | 10/1998 | Estakhri et al. |
| 5,822,245 A | 10/1998 | Gupta et al. |
| 5,822,252 A | 10/1998 | Lee et al. |
| 5,822,781 A | 10/1998 | Wells et al. |
| 5,831,929 A | 11/1998 | Manning |
| 5,835,935 A | 11/1998 | Estakhri et al. |
| 5,838,614 A | 11/1998 | Estakhri et al. |
| 5,845,313 A | 12/1998 | Estakhri et al. |
| 5,847,552 A | 12/1998 | Brown |
| 5,860,083 A | 1/1999 | Sukegawa |
| 5,860,124 A | 1/1999 | Matthews et al. |
| 5,862,099 A | 1/1999 | Gannage et al. |

| | | | |
|---|---|---|---|
| 5,890,192 A | 3/1999 | Lee et al. |
| 5,901,086 A | 5/1999 | Wang et al. |
| 5,907,856 A | 5/1999 | Estakhri et al. |
| 5,909,586 A | 6/1999 | Anderson |
| 5,920,884 A | 7/1999 | Jennings, III et al. |
| 5,924,113 A | 7/1999 | Estakhri et al. |
| 5,928,370 A | 7/1999 | Asnaashari |
| 5,930,815 A | 7/1999 | Estakhri et al. |
| 5,933,368 A | 8/1999 | Ma et al. |
| 5,933,846 A | 8/1999 | Endo |
| 5,936,971 A | 8/1999 | Harari et al. |
| 5,937,425 A | 8/1999 | Ban |
| 5,953,737 A | 9/1999 | Estakhri et al. |
| 5,956,473 A | 9/1999 | Ma et al. |
| 5,959,926 A | 9/1999 | Jones et al. |
| 5,966,727 A | 10/1999 | Nishino |
| 5,986,933 A | 11/1999 | Takeuchi et al. |
| 5,987,563 A | 11/1999 | Itoh et al. |
| 5,987,573 A | 11/1999 | Hiraka |
| 5,991,849 A | 11/1999 | Yamada et al. |
| 6,003,135 A | 12/1999 | Bialick et al. |
| 6,011,322 A | 1/2000 | Stumfall et al. |
| 6,011,323 A | 1/2000 | Camp |
| 6,018,265 A | 1/2000 | Keshtbod |
| 6,021,408 A | 2/2000 | Ledain et al. |
| 6,026,020 A | 2/2000 | Matsubara et al. |
| 6,026,027 A | 2/2000 | Terrell, II et al. |
| 6,034,897 A | 3/2000 | Estakhri et al. |
| 6,035,357 A | 3/2000 | Sakaki |
| 6,040,997 A | 3/2000 | Estakhri |
| 6,047,352 A | 4/2000 | Lakhani et al. |
| 6,055,184 A | 4/2000 | Acharya et al. |
| 6,055,188 A | 4/2000 | Takeuchi et al. |
| 6,069,827 A | 5/2000 | Sinclair |
| 6,072,796 A | 6/2000 | Christensen et al. |
| 6,076,137 A | 6/2000 | Asnaashari |
| 6,081,447 A | 6/2000 | Lofgren et al. |
| 6,081,878 A | 6/2000 | Estakhri et al. |
| 6,084,483 A | 7/2000 | Keshtbod |
| 6,097,666 A | 8/2000 | Sakui et al. |
| 6,115,785 A | 9/2000 | Estakhri et al. |
| 6,122,195 A | 9/2000 | Estakhri et al. |
| 6,122,737 A | 9/2000 | Bjorn et al. |
| 6,125,424 A | 9/2000 | Komatsu et al. |
| 6,125,435 A | 9/2000 | Estakhri et al. |
| 6,128,695 A | 10/2000 | Estakhri et al. |
| 6,134,145 A | 10/2000 | Wong |
| 6,134,151 A | 10/2000 | Estakhri et al. |
| 6,141,249 A | 10/2000 | Estakhri et al. |
| 6,145,051 A | 11/2000 | Estakhri et al. |
| 6,151,247 A | 11/2000 | Estakhri et al. |
| 6,172,906 B1 | 1/2001 | Estakhri et al. |
| 6,173,362 B1 | 1/2001 | Yoda |
| 6,181,118 B1 | 1/2001 | Meehan et al. |
| 6,182,162 B1 | 1/2001 | Estakhri et al. |
| 6,202,138 B1 | 3/2001 | Estakhri et al. |
| 6,219,736 B1 * | 4/2001 | Klingman ............. 710/315 |
| 6,223,308 B1 | 4/2001 | Estakhri et al. |
| 6,226,708 B1 | 5/2001 | McGoldrick et al. |
| 6,230,234 B1 | 5/2001 | Estakhri et al. |
| 6,262,918 B1 | 7/2001 | Estakhri et al. |
| 6,272,610 B1 | 8/2001 | Katayama et al. |
| 6,275,436 B1 | 8/2001 | Tobita et al. |
| 6,279,069 B1 | 8/2001 | Robinson et al. |
| 6,279,114 B1 | 8/2001 | Toombs et al. |
| 6,285,607 B1 | 9/2001 | Sinclair |
| 6,327,639 B1 | 12/2001 | Asnaashari |
| 6,345,367 B1 | 2/2002 | Sinclair |
| 6,374,337 B1 | 4/2002 | Estakhri |
| 6,393,513 B2 | 5/2002 | Estakhri et al. |
| 6,397,314 B1 | 5/2002 | Estakhri et al. |
| 6,411,546 B1 | 6/2002 | Estakhri et al. |
| 6,425,036 B2 * | 7/2002 | Hoese et al. ............ 710/315 |
| 6,467,021 B1 | 10/2002 | Sinclair |
| 6,490,649 B2 | 12/2002 | Sinclair |
| 6,567,307 B1 | 5/2003 | Estakhri |
| 6,578,127 B1 | 6/2003 | Sinclair |
| 6,587,382 B1 | 7/2003 | Estakhri et al. |
| 6,711,059 B2 | 3/2004 | Sinclair et al. |
| 6,725,321 B1 | 4/2004 | Sinclair et al. |
| 6,728,851 B1 | 4/2004 | Estakhri et al. |
| 6,751,155 B2 | 6/2004 | Gorobets |
| 6,757,800 B1 | 6/2004 | Estakhri et al. |
| 6,766,040 B1 | 7/2004 | Catalano et al. |
| 6,813,678 B1 | 11/2004 | Sinclair et al. |
| 6,898,662 B1 | 5/2005 | Gorobets |
| 6,912,618 B2 | 6/2005 | Estakhri et al. |
| 6,950,918 B1 | 9/2005 | Estakhri |
| 6,957,295 B1 | 10/2005 | Estakhri |
| 6,973,519 B1 | 12/2005 | Estakhri et al. |
| 6,978,342 B1 | 12/2005 | Estakhri et al. |
| 7,000,064 B2 | 2/2006 | Payne et al. |
| 7,039,037 B2 | 5/2006 | Wang et al. |
| 7,039,727 B2 * | 5/2006 | Camara et al. ............ 710/5 |
| 7,051,101 B1 | 5/2006 | Dubrovsky et al. |
| 7,069,307 B1 | 6/2006 | Lee et al. |
| 7,107,369 B2 * | 9/2006 | Bennett et al. ........... 710/62 |
| 7,209,980 B2 | 4/2007 | Wugofski et al. |
| 7,725,628 B1 * | 5/2010 | Phan et al. ............ 710/72 |
| 8,090,886 B2 * | 1/2012 | Phan et al. ............ 710/72 |
| 2003/0033471 A1 | 2/2003 | Lin et al. |
| 2004/0054836 A1 | 3/2004 | Lai et al. |
| 2004/0096087 A1 | 5/2004 | Funahashi |
| 2005/0026635 A2 | 2/2005 | Michaels et al. |
| 2005/0055479 A1 | 3/2005 | Zer et al. |

FOREIGN PATENT DOCUMENTS

| | | |
|---|---|---|
| EP | 0 220 718 A2 | 5/1987 |
| EP | 0 243 503 A1 | 11/1987 |
| EP | 0 392 895 A2 | 10/1990 |
| EP | 0 424 191 A2 | 4/1991 |
| EP | 0 489 204 A1 | 6/1992 |
| EP | 0 522 780 A2 | 1/1993 |
| EP | 0 522 780 B1 | 1/1993 |
| EP | 0 544 252 A2 | 6/1993 |
| EP | 0 613 151 A2 | 8/1994 |
| EP | 0 617 363 A2 | 9/1994 |
| EP | 0 619 541 A2 | 10/1994 |
| EP | 0 663 636 A1 | 7/1995 |
| EP | 0 686 976 A2 | 12/1995 |
| EP | 0 897 579 B1 | 7/2000 |
| EP | 0 891 580 B1 | 11/2000 |
| EP | 0 896 669 B1 | 11/2000 |
| EP | 0 852 766 B1 | 5/2001 |
| EP | 0 852 765 B1 | 9/2001 |
| EP | 0 722 585 B1 | 5/2002 |
| EP | 0 910 826 B1 | 6/2002 |
| EP | 0 691 008 B1 | 11/2002 |
| EP | 0 861 468 B1 | 4/2003 |
| EP | 0 978 040 B1 | 5/2004 |
| EP | 1 157 328 B1 | 5/2005 |
| FR | 93 01908 | 8/1993 |
| GB | 2 251 323 | 7/1992 |
| GB | 2 291 990 | 2/1996 |
| GB | 2 291 991 | 2/1996 |
| GB | 2 297 637 | 7/1996 |
| GB | 2 304 428 | 3/1997 |
| GB | 2 348 991 | 12/2002 |
| GB | 2 351 822 | 1/2003 |
| GB | 2 384 337 | 7/2003 |
| GB | 2 384 883 | 10/2005 |
| GB | 2 384 338 | 11/2005 |
| GB | 2 384 072 | 12/2005 |
| GB | 2 411 499 | 2/2006 |
| IS | 117881 | 5/2003 |
| JP | 59-45695 | 9/1982 |
| JP | 58-21594 | 12/1983 |
| JP | 58-21595 | 12/1983 |
| JP | 59-162695 | 9/1984 |
| JP | 60-212900 | 10/1985 |
| JP | 61-96598 | 5/1986 |
| JP | 62-283496 | 12/1987 |
| JP | 62-283497 | 12/1987 |
| JP | 63-183700 | 7/1988 |
| JP | 1-138694 | 5/1989 |
| JP | 3-228377 | 10/1991 |
| JP | 4-57295 | 2/1992 |
| JP | 4-254994 | 9/1992 |

| | | |
|---|---|---|
| JP | 4-268284 | 9/1992 |
| JP | 4-278297 | 10/1992 |
| JP | 4-332999 | 11/1992 |
| JP | 5-128877 | 5/1993 |
| JP | 5-282883 | 10/1993 |
| JP | 6-36578 | 2/1994 |
| JP | 6-124175 | 5/1994 |
| JP | 6-124231 | 5/1994 |
| JP | 6-132747 | 5/1994 |
| JP | 6-149395 | 5/1994 |
| JP | 6-131889 | 6/1994 |
| JP | 6-266596 | 9/1994 |
| JP | 7-93499 | 4/1995 |
| JP | 7-311708 | 11/1995 |
| JP | 8-18018 | 1/1996 |
| JP | 8-69696 | 3/1996 |
| JP | 9-147581 | 6/1997 |
| SU | 1388877 | 4/1988 |
| SU | 1408439 | 7/1988 |
| SU | 1515164 | 10/1989 |
| SU | 1541619 | 2/1990 |
| SU | 1573458 | 6/1990 |
| SU | 1686449 | 10/1991 |
| WO | WO 84/00628 | 2/1984 |
| WO | WO 94/20906 | 9/1994 |

OTHER PUBLICATIONS

Walter Lahti and Dean McCarron, "State of the Art: Magnetic VS Optical Store Data in a Flash", *Byte Magazine*, Nov. 1, 1990. 311, vol. 15, No. 12.

Ron Wilson, Technology Updates, Integrated Circuits, "I-Mbit flash memories seek their role in system design",*Computer Design* 28 (1989) Mar. 1, No. 5, Tulsa OK, US, pp. 30 and 32.

Mendel Rosenblum and John K. Ousterhout, "The Design and Implementation of a Log-Structured File System", 1991, 15 pgs., Berkeley, USA.

Brian Dipert and Markus Levy, *Designing with Flash Memory*, Annabooks, Apr. 1994, 445 pgs.

Science Forum, Inc. "Flash Memory Symposium '95", 1995, 13 pgs. Tokyo.

Ross S. Finlayson and David R. Cheriton, "An Extended File Service Exploiting Write-Once Storage", *ACM Symposium on Operating Systems Principles*, 1987, 10 pgs.

Jason Gait, "The Optical File Cabinet: A Random-Access File System for Write-Once Storage", *Computer*, Jun. 1988, 12 pgs.

Henry G. Baker, *Memory Management*, 1995, Springer-Verlag Heidelberg, Germany, 19 pgs.

Sape J. Mullender and Andrew S. Tanenbaum, "A Distributed File Service Based on Optimistic Concurrency Control", *ACM Press*, 1985, 12 pgs. New York, New York.

Hiroshi Nakamura, Junichi Miyamoto, Kenichi Imamiya and Yoshihisa Iwata, "A Novel Sense Amplifier for Flexible Voltage Operation NAND Flash Memories", VLSI Circuits, 1995, *Digest of Technical Papers*, 2 pgs.

Hiroshi Nakamura, Junichi Miyamoto, Kenichi Imamiya, Yoshihisa Iwata and Hideko Oodaira, "A Novel Sensing Scheme with On-Chip Page Copy for Flexible Voltage NAND Flash Memories", *IEICE Transactions on Electronics*, vol. E79-C, No. 6, pp. 836-844.

Takaaki Nozaki, Toshiaki Tanaka, Yoshiro Kijiya, Eita Kinoshita, Tatsuo Tsuchiya and Yutaka Hayashi, "A 1-Mb EEPROM with MONOS Memory Cell for Semiconductor Disk Application", *Journal of Solid-State Circuits*, vol. 26, No. 4, 5 pgs.

S. Mehroura, J.H. Yuan, R.A. Cemea, W.Y. Chien, D.C. Guteman, G. Samachisa, R.D. Norman, M. Mofidi, W. Lee, Y. Fong, A. Mihnea, E. Hann, R.W. Gregor, E.P. Eberhardt, J.R. Radosevich, K.R. Stiles, R.A. Kohler, C.W. Leung, and T.J. Mulrooney, "Serial 9Mb F EEPROM for Solid State Disk Applications", symposium, 2 pgs., 1992, Mountain View, CA.

Steven H. Leibson, "Nonvolatile, In-Circuit-Reprogrammable Memories", *EDN Special Report*, Jan. 3, 1991, No. 12, 12 pgs.

Walter Lahti and Dean McCarron, "State of the Art: Magnetic vs. Optical Store Data in a Flash", *Byte Magazine*, 1990, vol. 15, No. 12, 7 pgs.

Ramon Caceres, Fred Douglis, Kai Li and Brian Marsh, "Operating System Implications of Solid-State Mobile Computers", *Workshop on Workstation Operating Systems*, Oct. 1993, pp. 21-27.

Michael Wu and Wily Zwaenepoel, "A Non-Volatile, Main Memory Storage System", *ACM Press*, 1994, 12 pgs., San Jose, CA.

Dave Bursky, "Innovative flash memories match DRAM densities: available with a choice of features, flash memories are finding homes in many systems (including related articles on the origins of flash, and on the differences between NAND and NOR flash memories)", *Electronic Design*, May 16, 1994, vol. 42, No. 10, 9 pgs.

Anthony Cataldo, "New flash enhancements up ante. (Intel's 28F400BV-120 and 28F004BV-120, Atmel's AT29BV010 and AT29BV020, and Samsung Semiconductor's KM29V3200 flash memory devices)" (product announcement), *Electronic News*, Mar. 13, 1995, vol. 41, No. 2056, 4 pgs.

Sam Weber, "Flash modules' portability, reusability, small size valued for a host of APPs-Consumer formats flocking to flash", *Electronic Engineering Times*, Jul. 22, 1996, No. 911, 9 pgs.

Stan Baker, "But Integration Calls for Hardware, Software Changes: Flash designers face the dawn of a new memory age", *Electronic Engineering Times*, Dec. 3, 1990, vol. 41, No. 619, 5 pgs.

Toshiba, MOS Memory (Non-Volatile), 1995, Data Book.

Toshiba, Toshiba MOS Digital Integrated Circuit Silicon Gate CMOS, (TC58NS512DC), Mar. 21, 2001, 43 pgs., Data Book.

Toshiba, Toshiba Corporation, SMIL (Smartmedia Interface Library) Hardware Edition Version 1.00, Jul. 1, 2000, 136 pgs., Data Book.

Toshiba, Toshiba MOS Digital Integrated Circuit Silicon Gate, (TC58512FT), Mar. 5, 2001, 43 pgs., Data Book.

Toshiba, Toshiba MOS Digital Integrated Circuit Silicon Gate, (TC58DVM92A1FT00), Jan. 10, 2003, 44 pgs., Data Book.

Toshiba, Toshiba MOS Digital Integrated Circuit Silicon Gate, (TC58DVG02A1FT00), Jan. 10, 2003, 44 pgs., Data Book.

Toshiba, Toshiba MOS Digital Integrated Circuit Silicon Gate, (TC58100FT), Mar. 5, 2001, 43 pgs., Data Book.

Toshiba, MOS Memory (Non-Volatile), 1996, 279 pgs., Data Book.

"Fifth Biennial Nonvolatile Memory Technology Review", 1993 Conference, Jun. 22-24, 1993, Linthicum Heights, MD USA.

Dan Auclair, "Optimal Solid State Disk Architecture For Portable Computers", Silicon Valley PC Design Conference, Jul. 9-10, 1991, pp. 811-815.

\* cited by examiner

Key to FIG.8

DIRECT SECONDARY DEVICE INTERFACE BY A HOST

RELATED APPLICATIONS

This application is a continuation of U.S. application Ser. No. 12/765,338, titled "DIRECT SECONDARY DEVICE INTERFACE BY A HOST," filed Apr. 22, 2010 now U.S. Pat. No. 8,090,886 (allowed), which is a continuation of U.S. application Ser. No. 11/110,612 of the same title, filed Apr. 19, 2005 and issued as U.S. Pat. No. 7,725,628 on May 25, 2010, which claims the benefit of a previously filed U.S. Provisional Patent Application No. 60/564,125 filed on Apr. 20, 2004 of the same title all of which are incorporated herein by reference in their entirety.

BACKGROUND OF THE INVENTION

1. Field of the Invention

The present invention relates generally to the field of storage systems and particularly to a method and apparatus for providing direct interface between secondary function devices and application software modules included in the host of a storage system.

2. Description of the Prior Art

With the advent of nonvolatile or flash memory, consumer electronic devices have come to enjoy a wide variety of applications, such as a memory drive removably connectable to a Personal Computer (PC) or other such host devices.

FIG. 1 shows a prior art PC storage system 10 to include a host 12 coupled to a storage device 14, which may or may not be removably connected to the host 12. The device 14 is removably connectable to the host 12 through the interface 28, which in one example, is a Universal Standard Bus (USB) connector. The host 12 is shown to include application software module 16 coupled to a controller driver module 18. The controller device 20 is shown coupled to a sensor 22 and a flash memory unit 24. The flash memory unit 24 includes flash or nonvolatile memory for storing various types of electronic information even when no power is provided to the system 10. Example of the type of information stored in the unit 24 is based on the application of the system 10 and can be digital photographs, passwords, personal settings and the like.

The sensor 22 is shown connected to the device 20 through a connector 26, which in one example is an Serial Peripheral Interface (SPI) interface. The sensor 22 is a fingerprint sensor for detecting a human fingerprint when the tip of a finger is swiped thereover. The sensor 22, after noting a particular fingerprint, upon the completion of a finger swipe, causes storage of the fingerprint information in the flash memory unit 24 through the application software module 16, again through the controller device 20. In this manner, the sensor 22 is intended to add a level of security to the system 10 so that only the person whose fingerprint is recognized or matched to previously stored fingerprint information is given access to information stored in the flash memory unit 24.

An example of the application software module 16 includes 'Smartgenie', which is a software program for operating fingerprint information, causing storage of passwords and directing encryption information and other security-related information. The driver module 18 allows the module 16 to communicate with the controller device 20 by converting high-level software language to a lower-level comprehendible to hardware such as the controller device 20. Thus, the driver module 18 issues commands that are transmitted through the interface 28 to the controller device 20 that may or may not be followed by data through the same interface. As earlier stated, the host 12 may be a PC including an operating system, such as Windows by Microsoft, Inc. of Seattle, for directing system functions and mapping memory and recognizing entry points for various devices connected to the host 12.

The problem with the system 10 is that the sensor 22 remains unknown to the operating system of the host 12 due to a lack of entry point into the sensor 22. Stated differently, the operating system has no way of directly accessing the sensor 22, as the standard driver module, or driver module 18, does not have an actual entry point for the sensor 22. The driver module 18 generally directs the controller device 20, which, in turn, controls the flash memory unit 24 and the sensor 22.

In the prior art system 10, the application software module 16 communicates to the flash memory unit 24 because the controller device 20 is only allowed to communicate with the flash memory unit 24 and not the sensor 22, in accordance with the USB standard, which dictates the communication occurring through the interface 28. A need arises for the application software module 16 to communicate with the sensor 22.

FIG. 2 shows the prior art system 10 of FIG. 1 including some of the functions and devices depicted in FIG. 1 in addition to others. For example, in FIG. 2, the host 12 is shown to include three driver modules, the controller driver module 18, a sensor driver module 32 and a hub driver module 34. The storage device 14 is shown to include a hub 30 in addition to the controller device 20 and the sensor 22.

The driver module 32 communicates with the sensor 22 is shown coupled to the storage device 14 through the driver module 34 and the driver module 18 is also coupled to the storage device 14 through the driver module 34. Particularly, the driver module 34 causes coupling of the driver modules 18 and 32 to the hub 30 of the storage device 14.

The hub 30 is shown coupled to the sensor 22 and to the controller device 20. FIG. 2 shows that the way in which the system 10 works in order for the operating system (Windows for example) of the host 12 to load the driver module 32 to allow the application software module 16 to communicate with the sensor 22. There needs to be a system removing the driver module 34 and the hub 30 from the system 10. Also, there needs to be a system such that the driver module 32 is moved into the application software module 16 so that other applications of the host 12 are unaware of the sensor 22 through standard discovery mechanisms (querying the host's operating system).

The driver module 18 is for causing communication to flash memory via the controller device 20, whereas, the driver module 32 is for causing communication to the sensor 22. At any given time, the hub 30 determines a communication path either with the controller device 20 or the sensor 22, thus, the driver modules 32, 18 and 34 cannot directly and upon their wish communicate with the controller device 20 or sensor 22. The problem with such prior art systems is that all of the devices, i.e. the sensor 22, the flash memory and any other device connected in this manner (through the use of drivers within the host) are known to everyone and can thus be accessed, manipulated and/or deleted, which presents security issues. Additionally, the hub 30 and the driver modules 32 and 34 of FIG. 2 add unnecessary real estate to the system 10 resulting in increased manufacturing costs associated therewith. Even if the hub 30 is implemented in another device so that it appears that the system real estate is less than having the individual presence of a hub, the security concerns still remain and there are, nevertheless, unnecessary manufacturing costs.

In the case of the desire to have a device be un-temperable by third parties, there is a need for secondary devices to be accessible only to a select and predetermined number of parties while unknown to others so as to preserve security and at the same time, decrease the number of electronic devices so as to decrease system manufacturing costs.

The need also arises to allow the system to operate with less current thus helping to use devices that qualify under low power devices in the USB specification (for example) and to preserve battery power in wireless devices that include their own power source.

SUMMARY OF THE INVENTION

Briefly, an embodiment of the present invention includes a storage system having a storage device in communication with a host and including one or more function devices for communicating with application software modules, said application software modules issuing vendor specific commands to access said function devices, said function devices remaining unknown to said host and recognizing said vendor specific commands for acting thereupon, wherein said storage device causing said application software modules to access said function devices to increase the security of said storage device.

The foregoing and other objects, features and advantages of the present invention will be apparent from the following detailed description of the preferred embodiments which make reference to several figures of the drawing.

IN THE DRAWINGS

Figure 1:
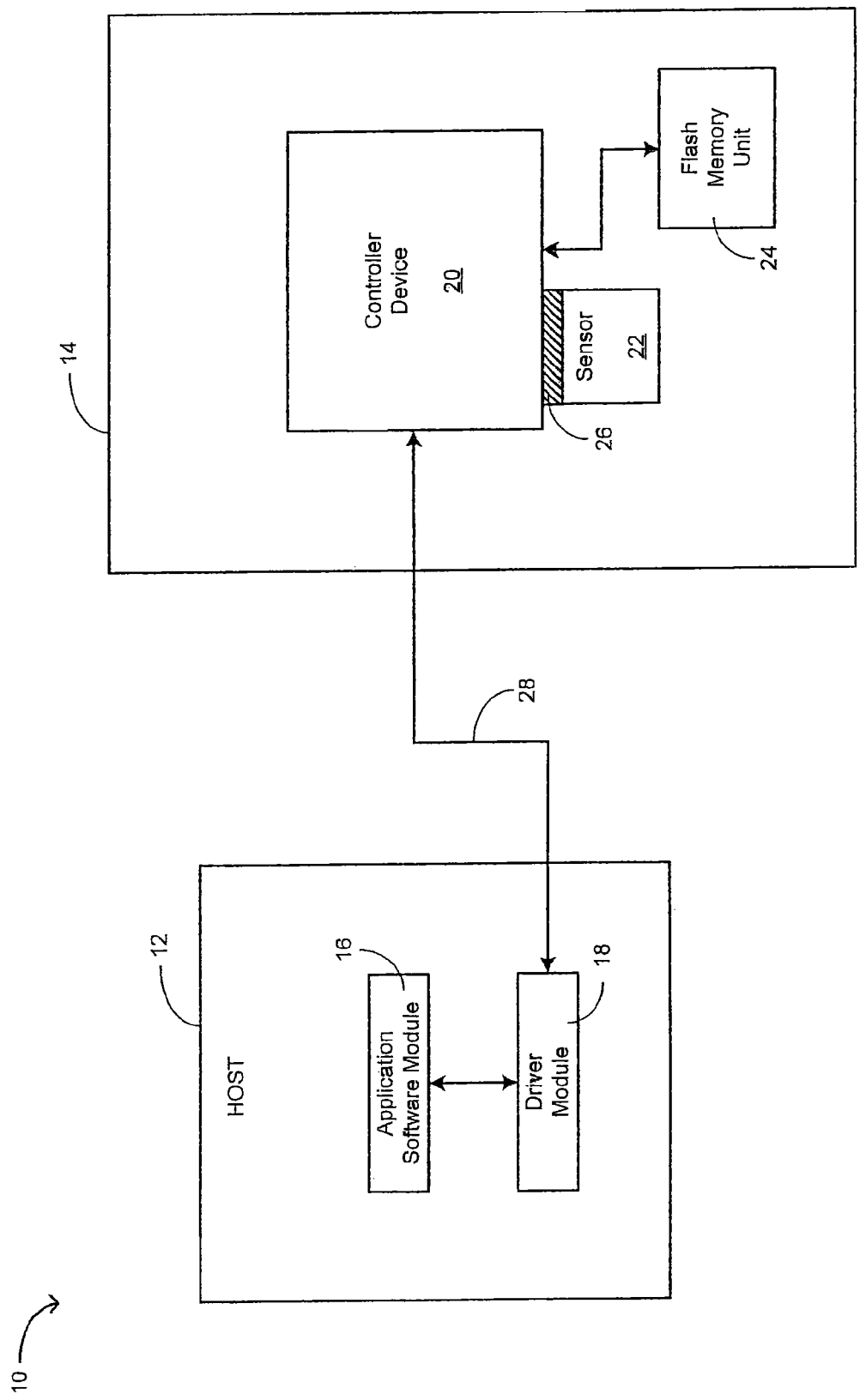
FIG. 1 shows a prior art PC storage system 10.
Figure 2:
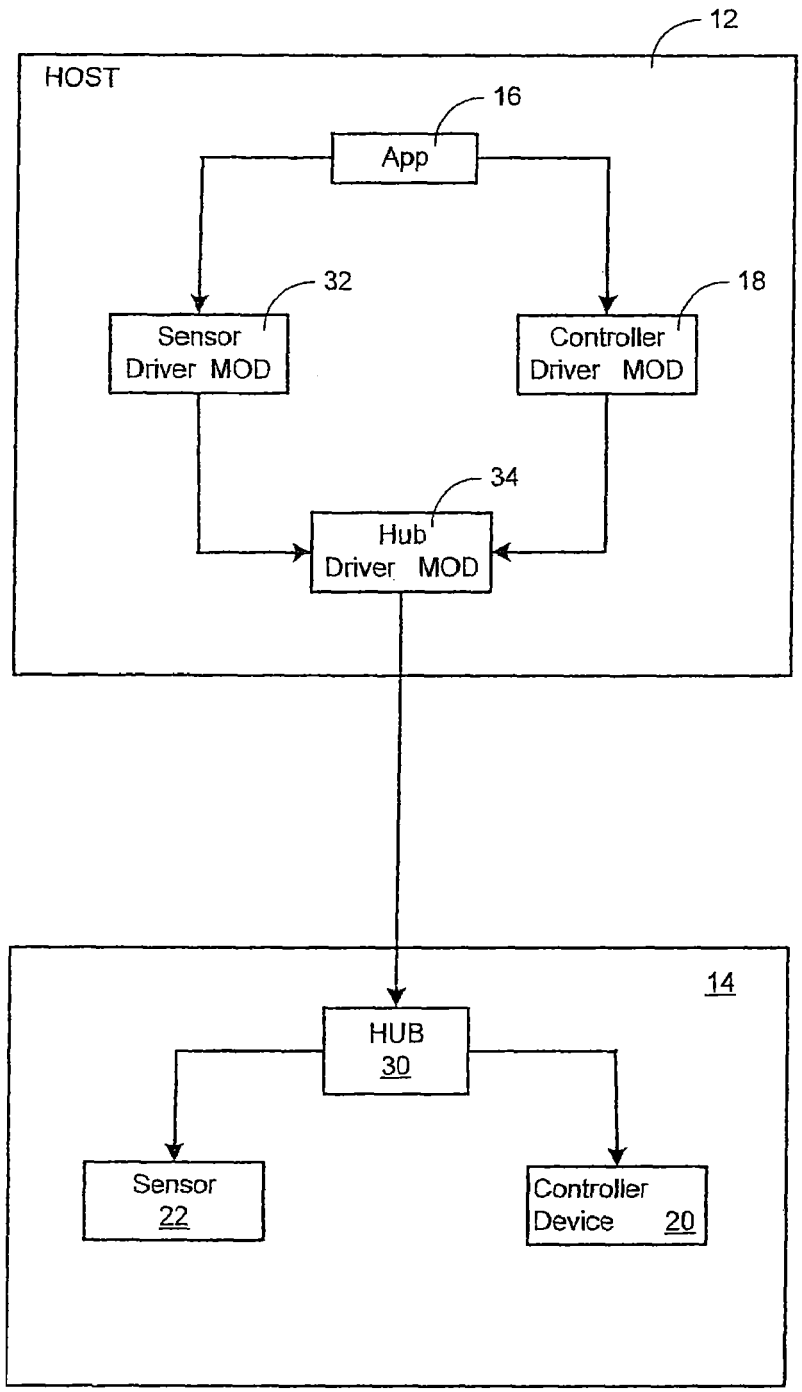
FIG. 2 shows a the prior art system 10 of FIG. 1 including some of the functions and devices depicted in FIG. 1 in addition to others.
Figure 3:
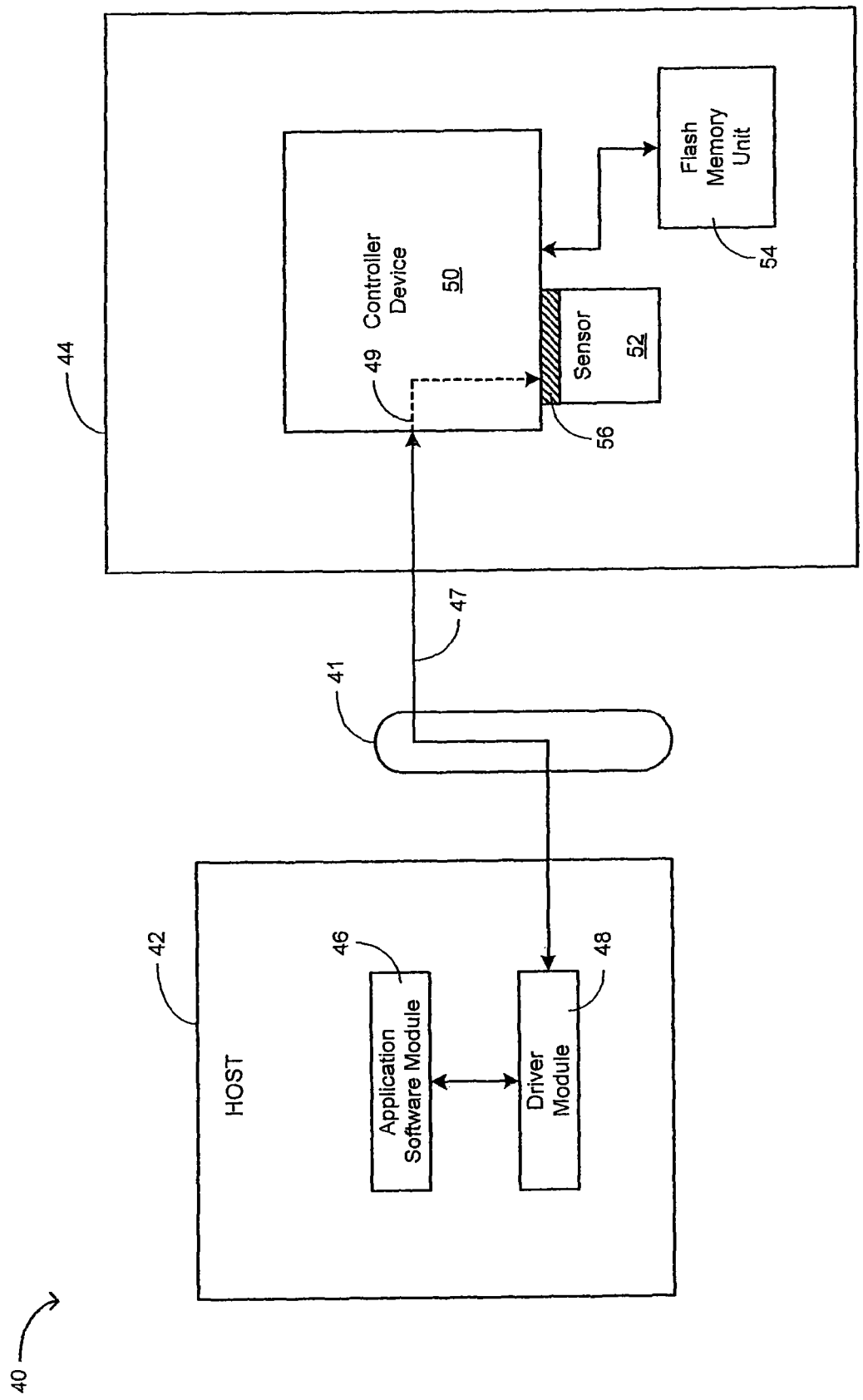
Figure 4:
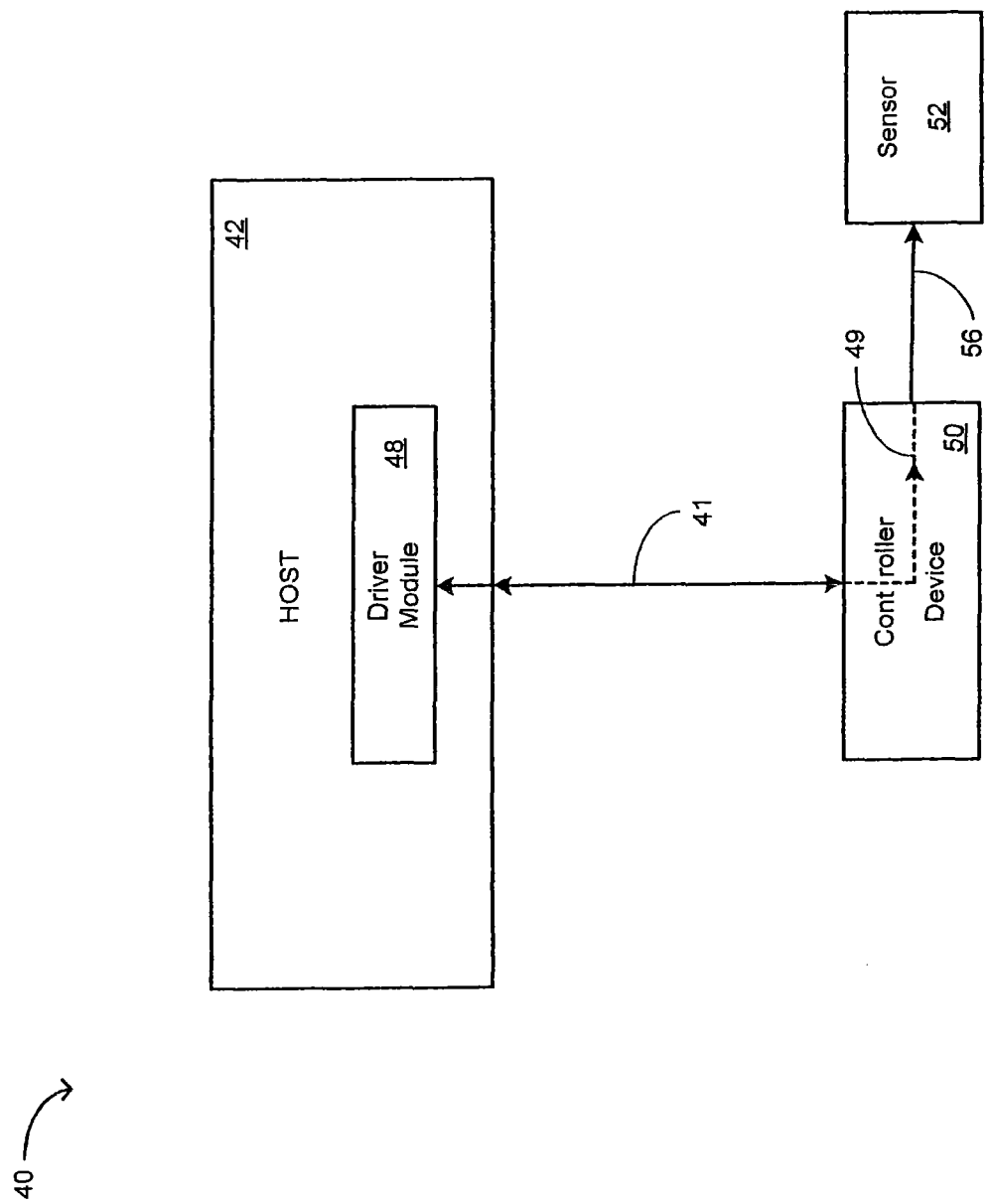
Figure 5:
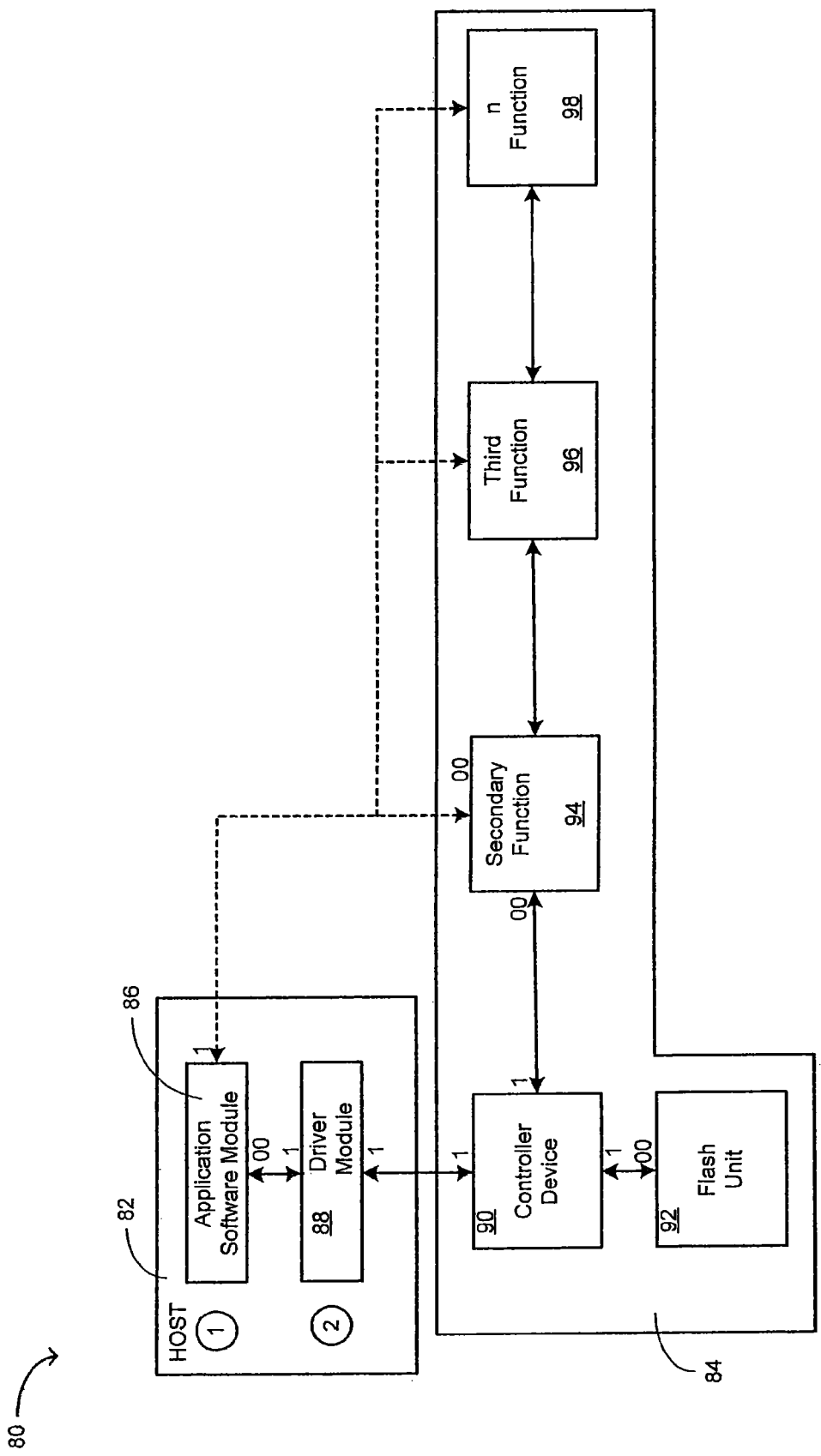
Figure 6:
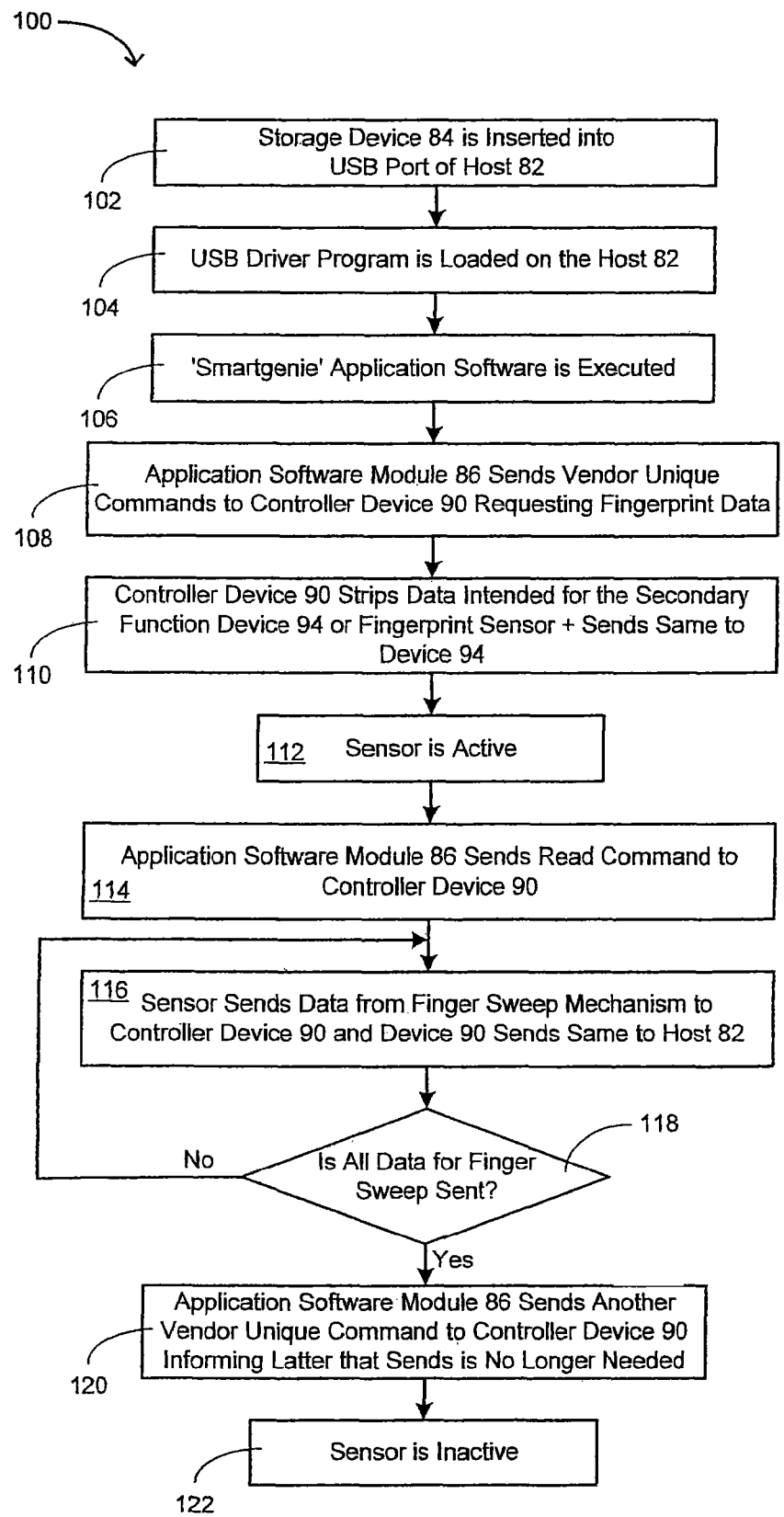
Figure 7:
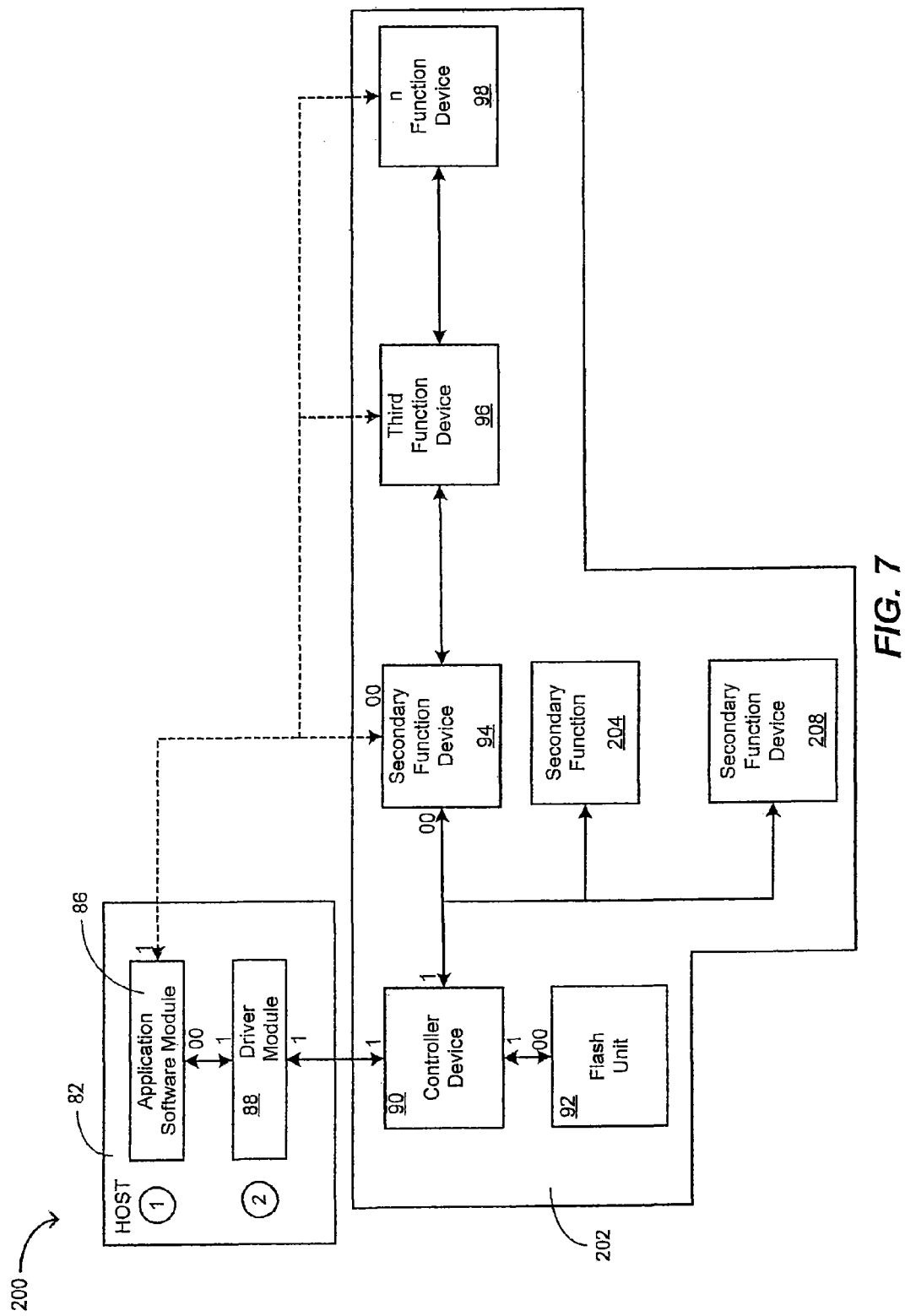

FIG. 3 shows a storage system 40 to include a host 42 coupled to a removable storage device 44 in accordance with an embodiment of the present invention;

FIG. 4 illustrates the storage system 40 including the driver module 48, which causes communication between the host 42 and the controller device 50, which, in turn, causes communication between the host 42 and the sensor 52;

FIG. 5 shows a storage system 80 in accordance with another embodiment of the present invention;

FIG. 6 shows a flow chart 100 as an example of the steps performed in FIG. 5; and FIG. 7 shows another alternative embodiment of the present invention to include a storage system 200 including the host 82 coupled to a storage device 202.

Figure 8I:
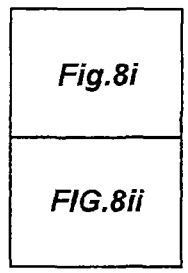
Figure 8I:
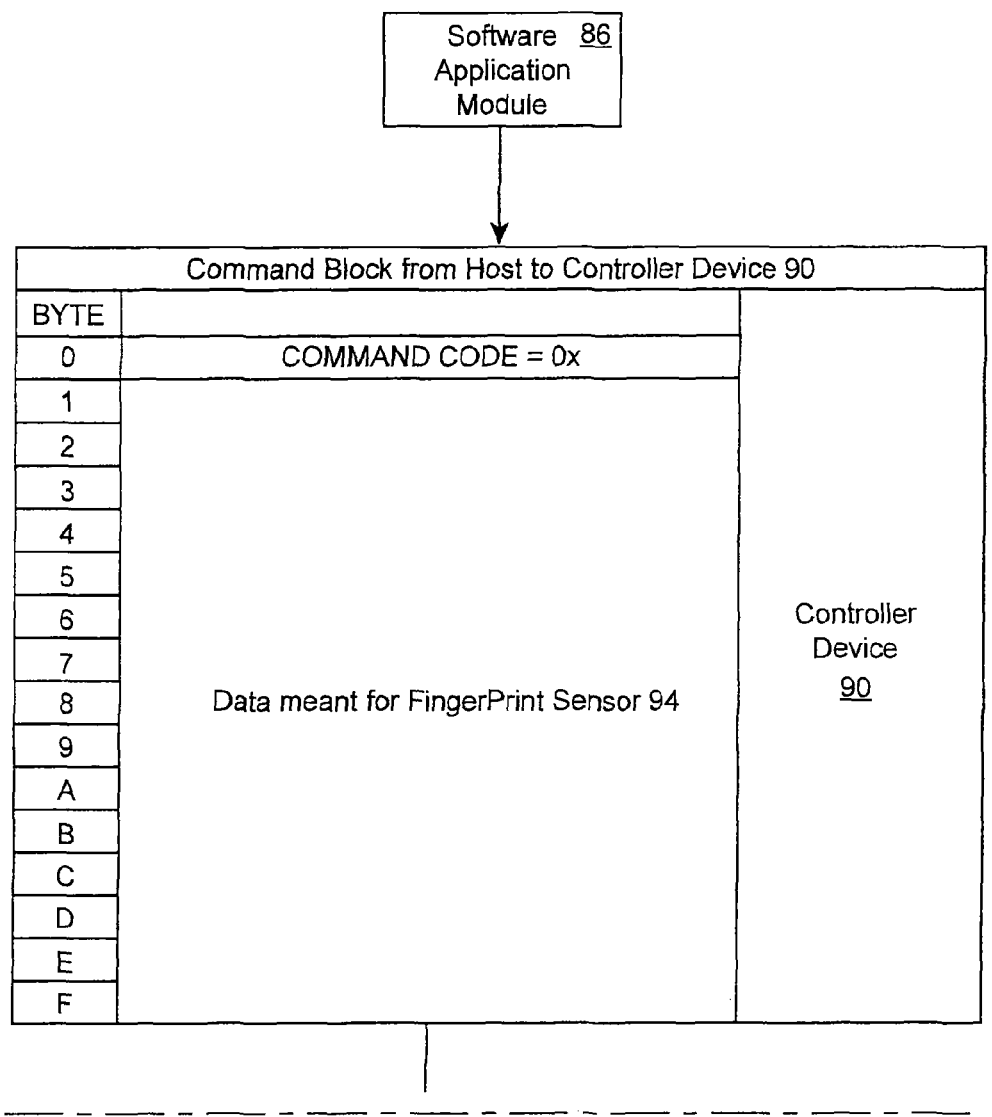
Figure 8I:
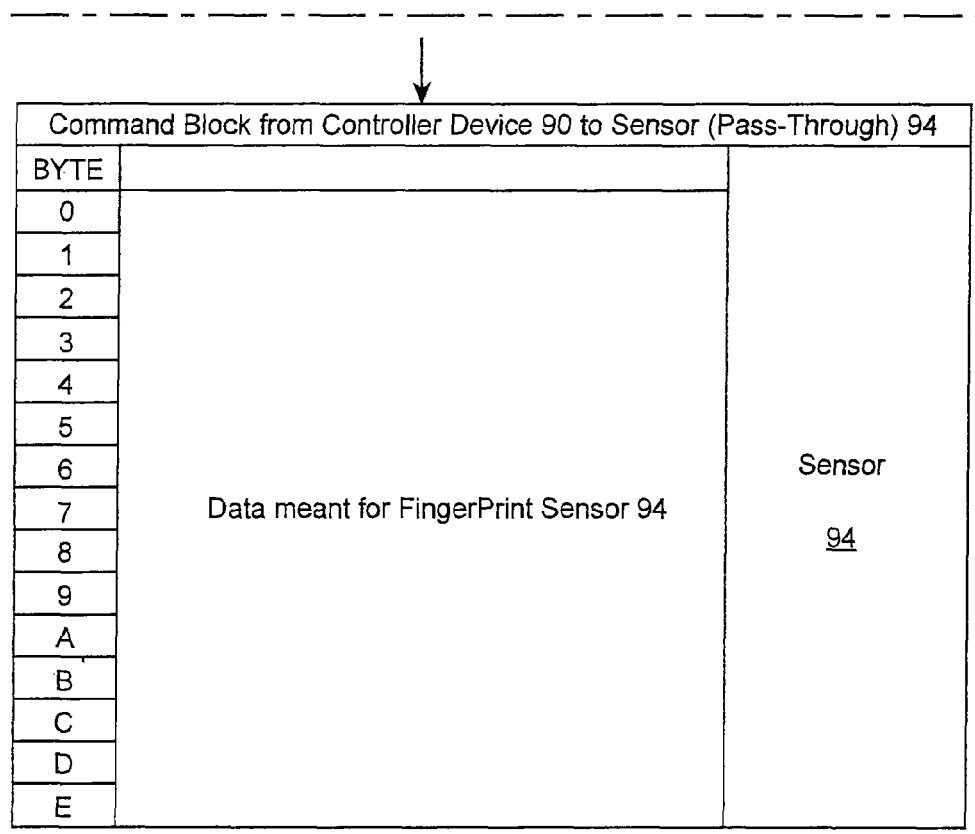

FIG. 8 shows, in block diagram and conceptual form, an example of a vendor specific command, i.e. 0xC9 (in hexadecimal notation), and its flow through the system 80 of FIG. 5 where the secondary function device 94 is a fingerprint sensor.

DETAILED DESCRIPTION OF THE PREFERRED EMBODIMENTS

Referring now to FIG. 3, a storage system 40 is shown to include a host 42 coupled to a storage device 44 in accordance with an embodiment of the present invention. The device 44 may be removably connectable to the host 42 through the interface 41, which in one example, is a Universal Standard Bus (USB) connector although the interface 41 may he of any other kind. Alternatively, the device 44 is permanently connected to the host 42. The host 42 is shown to include application software module 46 coupled to a driver module 48. The controller device 50 is shown coupled to a sensor 52 and a flash memory unit 54. The flash memory unit 54 includes flash or nonvolatile memory for storing various types of electronic information even when no power is provided to the system 40. Example of the type of information stored in the unit 54 is based on the application of the system 40 and can be digital photographs, passwords, personal settings and the like.

The sensor 52 is shown connected to the device 50 through a connector 56, which in one example is a Serial Peripheral Interface (SPI) interface but may be of any other kind of interface. The sensor 52 is a fingerprint sensor for detecting a human fingerprint when the tip of a finger is swiped thereover. The sensor 52, after noting a particular fingerprint, upon the completion of a finger swipe, causes storage of the fingerprint information in the flash memory unit 54 through the application software module 46, again through the controller device 50. In this manner, the sensor 52 is intended to add a level of security to the system 40 so that only the person whose fingerprint is recognized or matched to previously stored fingerprint information is given access to information stored in the flash memory unit 54.

An example of the application software module 46 includes 'Smartgenie', which is a software program for operating fingerprint information, causing storage of passwords and directing encryption information and other security-related information. The driver module 48 allows the module 46 to communicate with the controller device 50 by converting high-level software language to a lower-level comprehendible to hardware such as the controller device 50. Thus, the driver module 48 issues commands that are transmitted through the interface 41 to the controller device 50 that mayor may not be followed by data through the same interface. As earlier stated, the host 42 may be a PC including an operating system, such as Windows by Microsoft, Inc. of Seattle, for directing system functions and mapping memory and recognizing entry points for various devices connected to the host 42.

In FIG. 3, the sensor 52 is shown to be transparently coupled to the driver module 48 through an interface 49, which goes through the controller device 50 and onto the interface 47 and the controller device 50 is shown coupled to the driver module 48 through the interface 47. While the interface 41 is dictated by USB standard, other types of interfaces may be employed without departing from the scope and spirit of the present invention. It should be understood however, that during the use of a USB interface, the inventors of the present invention have found a way communicating with the sensor 52 even though the latter is obviously not a flash memory device and while such communication is formally not documented or allowed by the USB standard, as noted earlier. Briefly, the way in which this is performed is that vendor-specific commands are used to and incorporated into the driver module 48, from the controller device 50, that are recognized by the sensor 52 and that therefore allow the sensor 52 to act or react to commands issued through the driver module 48. The way in which this is performed will be discussed, in greater detail, shortly.

FIG. 4 shows the storage system 40 including the driver module 48, which causes communication between the host 42 and the controller device 50, which, in turn, causes communication between the host 42 and the sensor 52. In one embodiment of the present invention, the controller device 50 is physically located internally to the host 42 and in another embodiment of the present invention; it is physically located externally to the host 42, as shown in FIG. 4. In one embodiment of the present invention, the sensor 52 is located physically externally to the controller device 50 and the host 42, as shown in FIG. 4 and in another embodiment of the present invention, the sensor 52 is physically connectably removable to and from the host 42 through the connector 56 although other types of connectors may be employed. The controller device 50 communicates to the driver 48 through the interface 41, as described hereinabove.

It should be noted that the sensor 52 remains unknown to the host 42, yet, the controller device 50 is known to the host 42. The way in which this is done is by identifying an endpoint, known to the host 42, for the controller device 50, whereas, no endpoint is defined for the sensor 52. That is, the controller device 50 is mapped in the memory map of the host 42, whereas, the sensor is not mapped and thus remains invisible to the host 42.

FIG. 5 shows a storage system 80 in accordance with another embodiment of the present invention. The system 80 is shown to include a host 82 coupled to a storage device 84. The host 82 is shown to include an application software module 86 coupled to a driver module 88. While one application software module 86 is shown in FIG. 5, many such application software modules may be employed without departing from the scope and spirit of the present invention. The number of software modules is independent to the number of additional functions or function devices. Two or more applications can use the same additional function devices.

The storage device 84 is shown to include a controller device 90 coupled to a flash unit 92. The controller device 90 is also shown coupled to a secondary function device 94, which is shown coupled to a third function device 96, which is shown coupled to an n function device 98. The third device 96 may be coupled to another function device, which may be coupled to yet another function device and the n function device 98 is intended to show the last function device in the chain of coupled function devices with 'n' being an integer number.

The application software module 86, the driver module 88, the host 82, the controller device 90 and the flash unit 92 are that of similar modules and devices shown and discussed with respect to previous figures. The flash unit includes one or more flash or nonvolatile memory for storing information received from the controller device 90. In an alternative embodiment, the flash unit 92 need not employ nonvolatile memory and rather includes volatile memory.

The controller device 90 is shown coupled to the secondary function device 94, which may be one of many different types of devices according to the application of the system 80. As examples, the secondary function device 94 may be another controller device, a Light Emission Diode (LED), a fingerprint sensor, a processor, a camera, an MP3 or MPEG4 decoder or encoder or other types of devices, as can the third function device 96 and the n function device 98. In fact, the more function devices, the more functionality the system 80 is likely to include.

In one embodiment of the present invention, the host 82 is a personal computer (PC) and the driver module 88 is a USB mass storage driver and the controller device 90 is a USB controller and the application software module 86 is a 'Smartgenie' application software module with fingerprint matching and authentication programs.

In yet another embodiment of the present invention, the application software module 86 is a Windows moviemaker application software module and the controller device 90 is an Advanced Technology Attachment (ATA) controller known to those of ordinary skill in the art.

In still another application of the present invention, the driver module 88 is a wireless mass storage driver and the controller device is a wireless USB controller device.

In another embodiment of the present invention, the host 82 is embedded in an embedded system application.

In any of the foregoing applications or even other applications thought of or known to those of ordinary skill in the art, the configuration of the system, as noted above with respect to different applications may be mixed in a variety of ways without departing from the scope and spirit of the present invention.

In another embodiment of the present invention, the storage device 84 is physically a part of the host 82.

In FIG. 5, the application software module 86 is shown coupled to the secondary function device 94, the third function device 96 and the n function device 98.

It should be noted that while the devices 94-98 exist in the system 80, they remain unknown to the host 82 and to the driver module 88, as only the application software module 86 and the controller device 90 are aware of the devices 94-98. The application software module 86 accesses the secondary function device 94 though the controller device 90 using pass-through vendor specific commands, i.e. commands only known to the controller device 90 and the devices 94-98.

Referring now to FIG. 6, a flow chart 100 is shown as an example of the steps performed in FIG. 5 when a read operation takes place for reading information from the secondary device 94 when the application software module 86 is a 'Smartgenie' application. Thus, the steps outlined in flow chart 100 are merely an example and many other applications, commands and functionality can be employed without departing from the scope and spirit of the present invention. The steps of FIG. 6 refer to structures shown in FIG. 5.

In FIG. 6, at step 102, the storage device 84 is inserted into the host 82 through a USB port (not shown in FIG. 5). It should be understood that the port connecting the host 82 to the device 84 need not be a USB port and can be any type of connection known to those of ordinary skill in the art.

It should be noted that when the term host is used herein and referred to as performing an operation or a task, it is actually the operating system installed in the host, such as a Windows operating system although other operating systems may be employed, is causing the performance of such operation or task.

Next, at step 104, the program that is to be used as by the driver module 88 is transferred from the controller device 90 and loaded onto the host 82 and particularly within the driver module 88. While in the example of FIG. 6, the system 80 of FIG. 5 is to be employed as a fingerprint storage system where a fingerprint sensor serves as the secondary function device 94, the host 82, while recognizing the drive module 88, will not recognize the fingerprint sensor, i.e. the secondary function device 94.

When the storage device 84 is inserted into the host 82, the host 82 basically performs an accounting of what may be trying to communicate with it and it recognizes only the controller device 90 and not the devices 94-98. Accordingly, the host 82 creates what is referred to in the industry as an 'instance' of the device driver for the controller device 90.

It should be noted that in prior art systems, when an application software, such as 'Smartgenie' is used, a manufacturer provides a driver module that is loaded into the host 82 for communicating to the sensor or a secondary function module 94. However, in the method and apparatus of the present invention, no such driver exists and the secondary function module or sensor is actually unknown to the host 82 and thus, must be communicated thereto through the controller device 90 by the use of vendor specific commands. In fact, the driver module 88 does not know of the communication with the secondary function module 94 either.

Next, at step 106, the application software is executed from the application software module 86. In this example, the application software is 'Smartgenie'. As noted earlier, the 'Smargenie' application software causes performance of such tasks as saving of passwords, using fingerprint as password, encrypting and decrypting files and other tasks.

Next, at step 108, the application software module 86, i.e. 'Smartgenie', transmits a vendor specific command, through the driver module 88, to the controller device 90 requesting fingerprint data. The transmitted vendor specific command includes an embedded command intended for the fingerprint sensor, i.e. the secondary function device 94. Optionally, the controller device 90 can restrict access to the flash unit 92 to allow standard read/write commands to be issued through the driver module 88.

Next, at step 110, the controller device 90, upon receipt of the vendor specific command, strips the data intended for the secondary function device 94 from the vendor specific command and sends the stripped data to the secondary function device 94, i.e. the fingerprint sensor, through an SPI interface. Upon receiving the stripped data from the controller device 90, the fingerprint sensor is activated at step 112.

Next, at step 114, the application software module 86, i.e. the Smartgenie application software, sends a read command to the controller device 90, through the driver module 88, to read the fingerprint sensor. In the read command, some parameters may be specified, such as the size of the data to be returned. For example, there may be a request to have the sensor send back two kilobytes of data and upon receiving the command, the sensor waits until it has two kilobytes of data before sending it to the controller device. The application software module 86 may ask for additional data and continue to do so until it is satisfied. That is, the controller device 90 has no way of knowing how much data to return back to the application software module 86 while such information is obviously known to the application.

Next, at step 116, in response to the read command of step 114, the sensor transmits information gathered from a fingerprint mechanism which sweeps a user's finger to the controller device 90 and the device 90, in turn, transmits the same to the application software module 86 through the driver module 88. The data includes fingerprint information of the user's fingerprint, which is clearly unique to the user and can basically be used as a password by the user to access and/or store information.

Next, at 118, a determination is made as to whether or not all of the data of step 116, i.e. the fingerprint data, has been sent to the application software module 86 and if not, the process continues to step 116 and continues to do so until all of the fingerprint data is sent to the application software module 86. If, at 118, it is determined that all of the data has been sent to the application software module 86, the process continues to step 120.

At step 120, the application software module 86 or the 'Smartgenie' software causes transmission of another vendor unique command to the controller device 90 informing the latter that the sensor is no longer needed. Optionally, if access to the flash unit 92 is restricted in step 108, it needs to be unrestricted at this step to allow read/write commands to work as intended through the driver module 88.

Next, at step 122, the sensor is inactivated, as it is no longer necessary to read any further fingerprint data.

In the example of FIG. 6, all communication originates from the host 82 and particularly the application software module 86. Also, while only a vendor specific read command is discussed relative to FIG. 6, data may be saved to the secondary function device 94 though the use of a vendor specific write command issued by the application software module 86 to the controller device 90 through the driver module 88. Optionally, during read and/or write commands, access to the flash unit 92 may be prohibited either by the host 82 or the controller device 90. While not discussed in the example of FIG. 6, in another embodiment of the present invention, the secondary function device 94 may be a master to the third function device 96 and is connected to the controller device 90 through a Universal Asynchronous Read Transmit (UART)/SPI interface or other serial or parallel interfaces.

As stated earlier, the secondary and third and so on function devices 94-98 may be any combination of devices, such as one or more controller devices or processors or sensors or cameras and any other digital device.

By way of example, the following is source code showing how an application software module sends commands to a secondary function device, through the controller device. Particularly, this is an example of how the application software module 86 would communicate with a sensor (or secondary function device 94) through the controller device 90 using the driver module 88.

```
#include <ntddscsi.h> // this header file is used for definitions of SCSI functions
and structures
                                    //this header file is provided with the
Microsoft device driver kit for
                                    //Visual Studio 6.0
                                    //specifically used in this example:
                                    //
SCSI_PASS_THROUGH_WITH_BUFFERS -- structure used to setup CDB
                                    //SCSI_PASS_THROUGH--
structure used for size definitions
                                    //DeviceIoControl -- function to send scsi
structure to the flash controller
    /*
    *
    *    int main(int argc, char **argv)
    *
    *    Description:
    *        This is the main function. The entry point for program execution.
    *
    *    Inputs:
    *        argc - the number of command line arguments.
```

-continued

```
*
*/
int main(int argc, char **argv)
{
        HANDLE controllerHandle = NULL;
    //a file handle for talking to the USB controller
        SCSI_PASS_THROUGH_ WITH_BUFFERS sptwb;
    //a data structure that contains all the information I intend to send to the controller
        char deviceString[25] = "\\\\.\\PhysicalDrive0";      //example address to
the USB controller
        unsigned long returned = 0;
    //value that is returned from the controller on status of the operation
        //open a control pipe to the flash controller through the mass storage
driver.
        controllerHandle = CreateFile(deviceString,       // name of the "file"
to open
            GENERIC_WRITE|GENERIC_READ,
        //access granted
            FILE_SHARE READ | FILE_SHARE _WRITE,
    //share mode
            NULL,
        //security parameters - default is NULL
            OPEN_EXISTING,
        //do not create this, only open if the device is there
            0,
        //file attributes
            NULL);
        //a handle to another file with atributes I want to use
    //setup the standard part of the SCSI header and CDB
        ZeroMemory(&sptwb,
sizeof(SCSI_PASS_THROUGH_WITH_BUFFERS));
        sptwb.spt.Length = sizeof(SCSI_PASS THROUGH);
        sptwb.spt.PathId = 0;
        sptwb.spt.TargetId = 1;
        sptwb.spt.Lin = 0;
        sptwb.spt.CbdLength = CD10GENERIC_LENGTH;
        sptwb.spt.SenseInfoLength = 24;
        sptwb.spt.DataIn = SCSI_IOCTL_DATA_IN;
        sptwb.spt.DataTransferLength = INQUIRYDATALEN; //512;
      sptwb.spt.TimeOutValue = 2;
        sptwb.spt.DataBufferOffset
=offsetof(SCSI_PASS_THROUGH_WITH_BUFFERS,ucDataBuf);
      sptwb.spt.DataBufferOffset = (ULONG)(
offsetof(SCSI_PASS_THROUGH_WITH_BUFFERS,ucDataBuf));
        sptwb.spt.SenseInfoOffset =
offsetof(SCSI_PASS_THROUGH_WITH_BUFFERS,ucSenseBuf);
        //setup the 16 byte CDB with the vendor specific command
        //this example could be to tell the bio-metric sensor to starting reading data
from the sensor and
        //buffer it for the application to read later for matching purposes.
        //the values are created artificially and do not exist in any documentation -
used purely for explanation purposes.
        sptwb.spt.Cdb[0] = 0x00c9; // this tells the controller that the command
is pass through to the bio sensor
    *   now that I have told the sensor to get data, I need to read the data
from the sensor
    *    the process is very similar to the above and is not repeated to keep
the example brief.
    *
    */
        CloseHandle(fileHandle);
        return 0;
}
```

In FIG. 7, another alternative embodiment is shown to include a storage system 200 including the host 82 coupled to a storage device 202. The storage system 200 of FIG. 7 is similar to that of the system 80 of FIG. 5 except that the controller device 90 is coupled to a plurality of secondary function devices in parallel. In FIG. 7, the host 82 is shown to include the application software module 86 coupled to the driver module 88, which causes communication to the controller device 90 of the storage device 202. The structures, connection and coupling of the system 200 of FIG. 7 is similar to that of system 80 in FIG. 5 and thus, will not be discussed as to those similar structures, connection and coupling to avoid redundancy.

Unlike FIG. 5, the controller device 90 of FIG. 7 is shown coupled to a plurality of secondary function devices 94, 204 and 208. It should be noted that any number of secondary function devices may be coupled, in parallel, to the controller device 90. An example of an application of such a system is to have the secondary function device 94 be a sensor while the secondary function device 204 is an LED. The sensor as well as the LED are controlled by the application software module 86 rather than the controller device 90, as done by the prior art.

One of the advantages of the present invention is that the secondary, third and so on function devices, such as 94-98 of FIGS. 5 and 94, 204 and 208 of FIG. 7, remain unknown to the operating system of the host and thus are not accessed or used in any way by third parties, which greatly increases the security of the latter devices. Thus, if a fingerprint sensor is used as a secondary function device, its information will never be known, accessed or manipulated by others. This is accomplished, as stated above, by the use of vendor specific commands, which remain unknown to third parties.

Yet another advantage of the present invention is avoiding driver certification (WHQL, for example—by Microsoft) by the manufacturer of the operating system used by the host. That is, when a device, such as a sensor is to be added to a PC, the manufacturer of the operating system, such as Microsoft, Inc., will have to certify the device by adding a device driver to the next version of the operating system it releases, which is a painstaking and perhaps prolonged process to both Microsoft and particularly to those in need of the device. The present invention avoids such a certification by modifying the application software of the application software module to cause communication with the device or sensor through the use of vendor unique commands facilitated by the controller device. There is no additional software to certify.

The present invention allows for a driver module, the driver module 88 of FIG. 5, to communicate to a standard device, i.e. the controller device 90 of FIG. 5, but actually controlling a third or more devices, i.e. the secondary function device 94 of FIGS. 5 and 7, by embedding commands directed to the third or more devices. A practical example is if in FIG. 5, the secondary function device 94 is a Liquid Crystal Display (LCD) monitor and the driver module 88 controls a keyboard. Accordingly, the application software module 86 sends an image to the keyboard and by doing so, the controller device 90 would know to send the image to the monitor for display.

As stated earlier, the device 84 of FIG. 5 may be physically located with the host 82, i.e. an embedded system.

The storage systems of the present invention, as presented in the foregoing figures, operate with less current than that of prior art systems, thus, helping to use devices that qualify under low power devices in the USB specification (for example) and to preserve battery power in wireless devices that include their own power source.

The storage systems shown in FIGS. 3, 5 and 7, include a processor (not shown), or computer medium, some type of storage area and a computer readable medium, for storing the software/firmware described in FIGS. 3, 5 and 7. The processor executes codes from the computer readable medium for effectuating the functions outlined in FIGS. 3, 5 and 7.

FIG. 8 shows, in block diagram and conceptual form, an example of a vendor unique command, i.e. 0xC9 (in hexadecimal notation), and its flow through the system 80 of FIG. 5 where the secondary function device 94 is a fingerprint sensor.

Particularly, the controller device 90 receives the command, in hexadecimal code notation, 0xC9 from the application module 86 and then passes it on to the secondary function device or sensor 94. The command is followed by bytes needed for the registers of the sensor (not shown). The controller device 90 then passes these bytes onto the sensor.

It should be noted that in the example of FIG. 8, there is no data involved with the command. The controller device 90 sends a status to the host regarding whether or not the command is successful, in which case a status of 'good' is returned to the host, otherwise, a status of 'check condition' is sent to the host.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A device comprising:
a controller; and
a function module configured to be in communication with the controller as a result of the controller receiving a pass-through vendor specific command;
wherein the controller is configured to receive the pass-through vendor specific command from an application software module of a host through an interface that is configured in accordance with a standard that does not allow communication to occur between the controller and the function module; and
wherein the controller is configured to pass the pass-through vendor specific command to the function module in response to determining that the pass-through vendor specific command is to be passed to the function module.

2. The device of claim 1, wherein the function module comprises a sensor.

3. The device of claim 1, wherein the device comprises a storage device.

4. The device of claim 1, wherein the host further comprises a driver module configured to allow the application software module to send the pass-through vendor specific command through the driver module and the interface to the controller.

5. The device of claim 1, wherein the function module comprises a first function device, and further comprising a second function device.

6. The device of claim 5, wherein the second function device is coupled to the first function device.

7. The device of claim 5, wherein the second function device and the first function device are coupled to the controller in parallel.

8. The device of claim 1, wherein the function module configured to be in communication with the controller as a result of the controller receiving a pass-through vendor specific command comprises the function module being configured to recognize the vendor specific command for acting thereupon.

9. The device of claim 1, further comprising a memory unit configured to store information received from the controller.

10. The device of claim 1, wherein the function module comprises one of another controller, a Light Emission Diode (LED), a fingerprint sensor, a processor, a camera, a decoder, or an encoder.

11. The device of claim 1, wherein the controller comprises a USB controller.

12. The device of claim 1, wherein the vendor specific command comprises an embedded command intended for the function module.

13. The device of claim 1, wherein the controller is configured to strip data intended for the function module from the vendor specific command and send the stripped data to the function module.

14. The device of claim 13, wherein the function module is configured to be activated upon receiving the stripped data from the controller.

15. The device of claim 5, wherein the first function device is a master to the second function device.

16. The device of claim 1, wherein the controller is coupled to the function device through a Universal Asynchronous Read Transmit (UART) interface.

17. The device of claim 1, wherein the controller is coupled to the function device through a SPI interface.

18. The device of claim 1, wherein the function module comprises a Liquid Crystal Display (LCD) monitor.

19. The device of claim 1, wherein the function module is further configured to be in communication with the controller only as a result of the controller receiving the pass-through vendor specific command.

20. The device of claim 1, wherein the controller is configured to determine whether the pass-through vendor specific command is to be passed to the function module.

21. A device comprising:
a controller;
a function module configured to be in communication with the controller as a result of the controller receiving a pass-through vendor specific command; and
a memory unit configured to store information received from the controller;
wherein the controller is configured to receive the pass-through vendor specific command from an application software module of a host through an interface that is configured in accordance with a standard that does not allow communication to occur between the controller and the function module; and
wherein the controller is configured to pass the pass-through vendor specific command to the function module in response to determining that the pass-through vendor specific command is to be passed to the function module.

22. The device of claim 21, wherein the controller is configured to determine whether the pass-through vendor specific command is to be passed to the function module.

23. The device of claim 21, wherein the function module is further configured to be in communication with the controller only as a result of the controller receiving the pass-through vendor specific command.

24. A system, comprising:
a host comprising an application software module;
a controller; and
a function module configured to be in communication with the controller as a result of the controller receiving a pass-through vendor specific command;
wherein the controller is configured to receive the pass-through vendor specific command from the application software module of the host through an interface that is configured in accordance with a standard that does not allow communication to occur between the controller and the function module; and
wherein the controller is configured to pass the pass-through vendor specific command to the function module in response to determining that the pass-through vendor specific command is to be passed to the function module.

25. The system of claim 24, wherein the controller is configured to determine whether the pass-through vendor specific command is to be passed to the function module.

26. The system of claim 24, wherein the function module is further configured to be in communication with the controller only as a result of the controller receiving the pass-through vendor specific command.

27. A system, comprising:
a host having application software;
a controller;
a function module; and
a driver module of the host configured to communicate with the controller;
wherein the application software is configured to send a pass-through vendor specific command to the controller through the driver module;
wherein the driver module is configured to embed a command directed to the function module in the pass-through vendor specific command; and
wherein pass-through vendor specific command is sent through an interface that is configured in accordance with a standard that does not allow communication to occur between the controller and the function module.

* * * * *